United States Patent [19]

Bailey et al.

[11] Patent Number: 4,480,728
[45] Date of Patent: Nov. 6, 1984

[54] RETARDER BRAKE CONTROL

[75] Inventors: Keith A. Bailey; Stephen F. Spurlin, both of Indianapolis, Ind.

[73] Assignee: General Motors Corporation, Detroit, Mich.

[21] Appl. No.: 441,604

[22] Filed: Nov. 15, 1982

[51] Int. Cl.³ ............................................ F16F 11/00
[52] U.S. Cl. .................................. 188/271; 188/296; 192/4 B; 303/3; 303/13
[58] Field of Search ....................... 188/271, 290, 296; 303/2, 3, 13; 192/4 B, 4 A, 4 R

[56] References Cited

U.S. PATENT DOCUMENTS 4,235,320  11/1980  Polak et al. .................... 192/4 B
4,324,320   4/1982  Spurlin et al. ................... 188/271

Primary Examiner—Bruce H. Stoner, Jr.
Assistant Examiner—Michael P. Gilday
Attorney, Agent, or Firm—Saul Schwartz

[57] ABSTRACT

A control system for a combination hydrodynamic and friction retarder brake wherein in an output speed range above a first reference speed retarder braking is entirely hydrodynamic, in an output speed range between the first reference speed and a lower second reference speed retarder braking is partially hydrodynamic and partially friction with friction braking increasing as output speed decreases to a maximum at the second reference speed, and in an output speed range below the second reference speed both friction and hydrodynamic retarder braking decrease as output speed decreases to provide a smooth transition to the vehicle's service brakes. In addition, a partial apply valve is provided to limit retarder braking in all speed ranges to levels proportional to a manually applied retarder brake demand signal.

5 Claims, 6 Drawing Figures

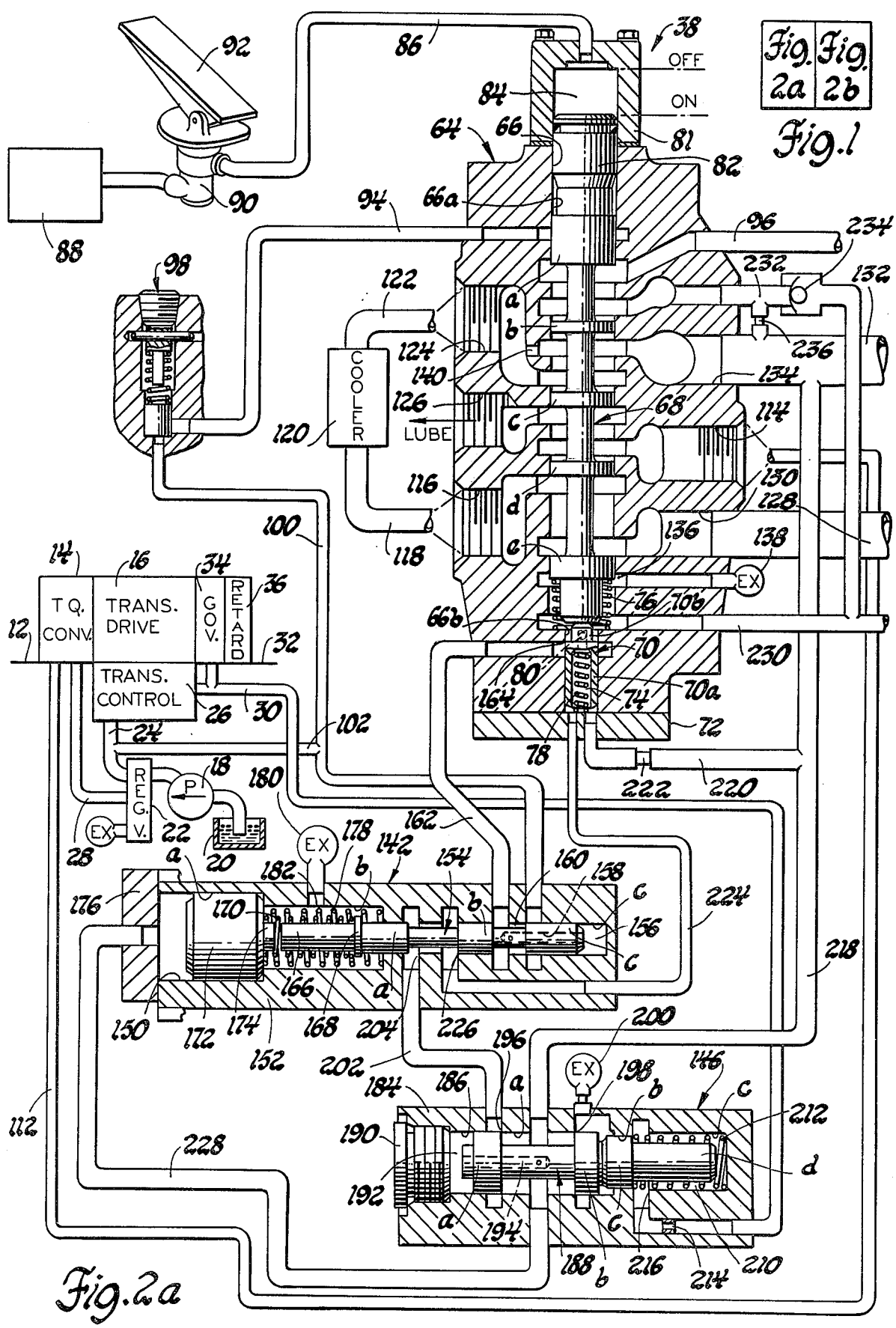

RETARDER BRAKE CONTROL

FIELD OF THE INVENTION

This invention relates generally to control systems for retarder brakes and more particularly to control systems for retarder brakes having friction brake portions and hydrodynamic brake portions.

DESCRIPTION OF THE PRIOR ART

While hydrodynamic retarder brakes have been successfully used for vehicle speed control on downhill grades, they inherently become increasingly less effective as vehicle speed decreases. To compensate for this, combination hydrodynamic and friction retarder brakes, such as those shown in U.S. Pat. Nos. 4,235,320 and 4,324,320, issued to Polak et al and to Spurlin et al, respectively, and assigned to the assignee of this invention, have been proposed. In both U.S. Pat. Nos. 4,235,320 and 4,324,320 the combination retarder brakes are controlled according to schedules dictating increasing friction braking as vehicle speed decreases to a complete stop. In addition, in U.S. Pat. No. 4,235,320 hydrodynamic braking continually increases in proportion to vehicle speed in a high speed range while, in U.S. Pat. No. 4,324,320, hydrodynamic braking achieves a maximum in the high speed range and then moderates as speed increases further to limit component stress. A control system according to this invention, when applied to combination hydrodynamic and friction retarder brakes as described in the aforementioned Polak et al and Spurlin et al patents, provides an improved combination of hydrodynamic and friction braking whereby retarder friction brake life is prolonged and a smooth transition from braking by the retarder assembly to braking by the vehicle's service brakes is effected.

SUMMARY OF THE INVENTION

Accordingly, the primary feature of this invention is that it provides an improved control system for a vehicle retarder brake having a hydrodynamic brake portion and a friction brake portion. Another feature of this invention is that it provides an improved control system whereby in an output speed range above a first reference speed braking is entirely hydrodynamic, in an output speed range between the first reference speed and a lower second reference speed braking is partially hydrodynamic and partially friction with friction braking increasing as output speed decreases to a maximum at the second reference speed, and in an output speed range below the second reference speed both friction and hydrodynamic braking decrease as output speed decreases to provide a smooth transition to the vehicle's service brakes. Still another feature of this invention resides in the provision of an improved control system wherein a friction brake apply pressure is regulated generally in proportion to output speed up to the second reference speed and at a constant maximum magnitude thereafter and wherein a hydrodynamic brake charging pressure is regulated below the friction brake apply pressure and generally in proportion to speed up to the first reference speed and thereafter at the same constant maximum magnitude as the friction brake apply pressure so that in the retarder assembly, where a net friction brake apply pressure equals the difference between the friction brake apply pressure and charging pressure, retarder friction braking increases to a maximum as output speed decreases from the first reference speed to the second reference speed and thereafter decreases with decreasing output speed. Yet another feature of this invention resides in the provision in the improved control system of a partial apply valve operative to limit the friction brake apply pressure and the hydrodynamic brake charging pressure to the lesser of magnitudes as determined in accordance with the output speed schedules and magnitudes proportional to a manually generated brake demand signal to effect retarder friction and retarder hydrodynamic braking in proportion to operator demand at levels below maximum.

These and other features of this invention will be apparent from the following specification and from the drawings wherein:

FIG. 1 shows the arrangement of FIGS. 2a and 2b;

FIGS. 2a and 2b, when arranged as shown in FIG. 1, show in generally schematic fashion a combination friction and hydrodynamic brake having a control system according to this invention;

Figure 2B:
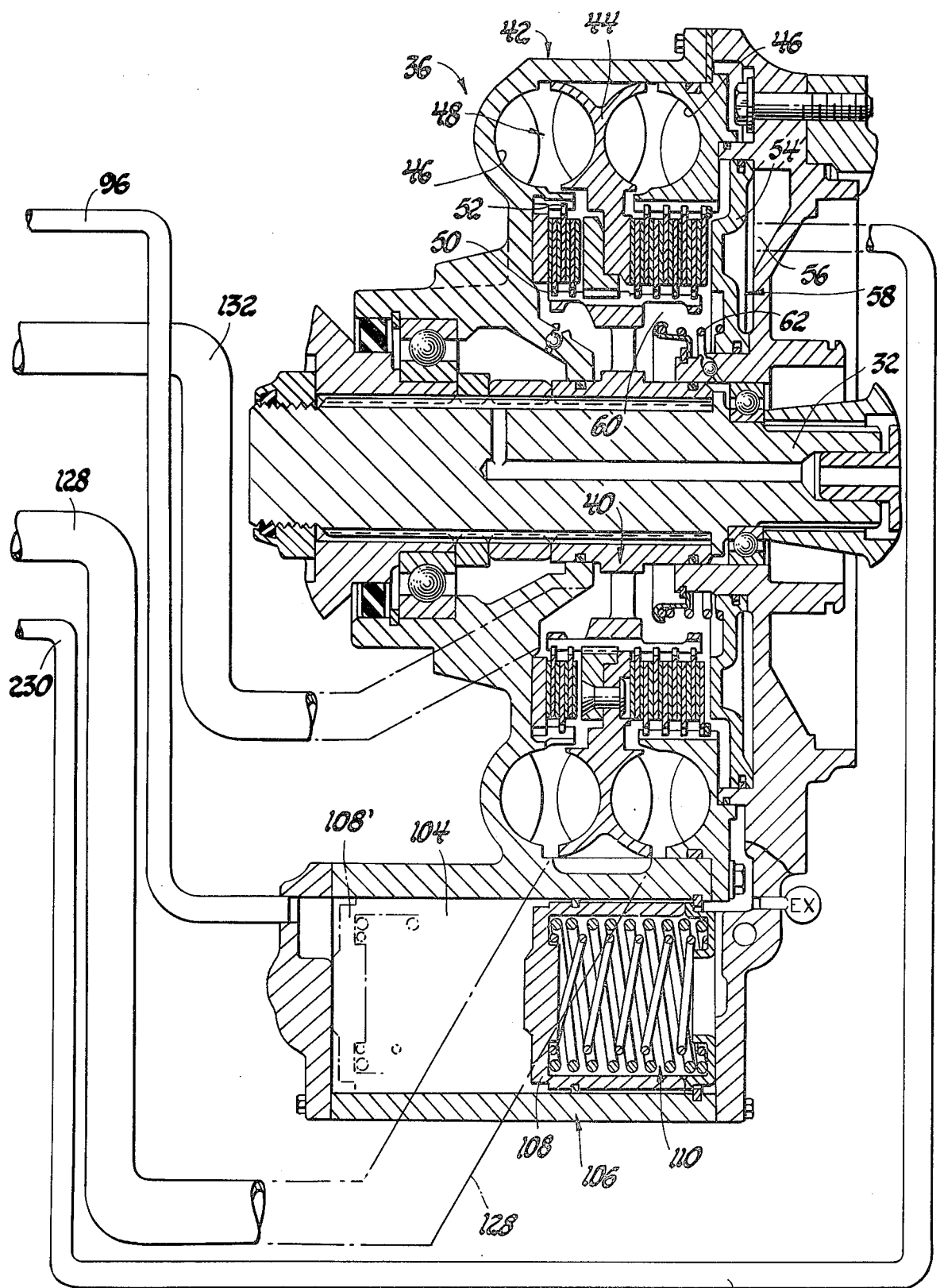

Referring now to FIG. 2a of the drawings, an engine driven input shaft 12 is connected to the impeller portion of a torque converter 14. The turbine portion of the torque converter is connected to an intermediate shaft, not shown, which functions as the input shaft to the range gearing of an automatic transmission 16 having a plurality of hydraulically actuated ratio establishing clutches and brakes. The output of an engine driven pump 18, drawing fluid from a sump 20, is regulated at a high main pressure by a valve 22 and directed by a conduit 24 to a control assembly 26 associated with the transmission 16. First overage from the valve 22 is directed through a conduit 28 to the torque converter 14 and regulated at a lower torque converter inlet pressure by valve means, not shown. Overage fluid from the transmission control assembly 26 in a conduit 30 is regulated at magnitudes or governor pressure directly proportional to the speed of an output shaft 32 of the transmission 16 by an output speed governor 34. A retarder brake 36, FIGS. 2a and 2b, is operatively connected to the output shaft 32 and is controlled by a control system according to this invention and designated generally 38.

As seen best in FIGS. 2a and 2b, the retarder brake 36 is substantially identical to the retarder brake shown and described in the aforementioned U.S. Pat. No. 4,324,320 to Spurlin et al and reference may be made thereto for a full and complete description of the details of the assembly. Basically, the retarder brake 36 includes a rotor 40 drivingly connected to the output shaft 32 within a housing assembly 42 made up of a plurality of elements such as a cover, an adapter plate and the like all bolted together and to the transmission 16 to form the fixed structure of the retarder brake. The rotor 40, at its radially outermost portion, defines a double sided impeller 44 which cooperates with a plurality of pairs of bladed cavities 46 formed in the housing assembly 42 on opposite sides of the impeller 44 in defining a hydrodynamic brake portion 48 of the retarder brake. In addition, a plurality of friction discs 50 rotate with the rotor 40 and are interleaved between a similar plurality of friction discs 52 splined to the housing assembly 42. An annular piston 54 slidably disposed on the housing assembly 42 is operative to compress the friction discs 50 and 52 when fluid at a friction brake apply pressure is introduced into an annular chamber 56 formed between the housing assembly 42 and the annular piston, the piston and friction discs thus defining a friction brake portion 58 of the retarder brake 36. The interior of the housing assembly 42, including the wall defined by the inner surface of annular piston 54, defines a closed chamber designated generally 60 adapted to be filled with hydraulic fluid at varying charging pressures which establish the degree of hydrodynamic braking achieved. In addition, because the charging pressure within the closed chamber 60 acts on the annular piston 54 in opposition to the friction brake apply pressure in chamber 56, a net effective friction brake apply pressure tending to press the piston 54 against the friction discs 50 and 52 is equal to the difference between the charging pressure and the friction brake apply pressure. A return spring 62 exerts a force corresponding to about 4 PSI of fluid pressure on the piston 54 acting with charging pressure and against the friction brake apply pressure. When the charging pressure and the friction brake apply pressure are equal, i.e., the net effective friction brake apply pressure is zero, the return spring 62 between the housing 42 and the piston 54 separates the latter from the friction discs so that no friction braking occurs.

With continued reference to FIGS. 2a and 2b, the control system 38 includes a main valve body 64 having a bore 66 therethrough with a large diameter portion a and a small diameter portion b. A valve spool 68 having equal diameter lands a, b, c, d and e is disposed in bore portion 66a for sliding movement between an "off" position, not shown, and an "on" position illustrated in FIG. 2a. A partial apply valve 70 having a large land a and a small land b is slidably disposed in bore portion 66b and cooperates with the latter and a closure 72 over the lower end of the bore 66 in defining a spring chamber 74. A spring 76 disposed between land 68e and the base of bore portion 66a biases spool 68 to the "off" position and a spring 78 in chamber 74 biases the partial apply valve upward so that land 70b engages the lower end of spool 68 and moves as a unit therewith when the spool is in the "on" position. Chamber 74 communicates with the annulus between land 70b and the bore portion 66b through a passage 80 in land 70b. A cap 81 is bolted to the valve body 64 over bore 66 and has a seal carrying plug 82 slidably disposed therein. The plug engages the top of land 68a and cooperates with the cap 81 in defining a demand signal chamber 84.

A conduit 86 extends between the chamber 84 and a compressed air reservoir 88 and has a regulator 90 disposed therein under the control of a foot pedal 92. Actuation of the pedal in proportion to the amount of retarder braking demanded actuates the regulator to regulate air pressure in chamber 84 proportionately so that at maximum retarder brake demand the air pressure in chamber 84 is maximum and exceeds generally about 85 PSI. The spring 76, being relatively weak, holds the spool 68 in the "off" position only until regulated air pressure in chamber 84 exceeds about 15 PSI, corresponding to minimum retarder braking demand, whereupon the spool 68 strokes completely to the "on" position engaging partial apply valve 70.

In the "off" position of the spool 68, a main pressure conduit 94 communicates with an accumulator conduit 96 between lands 68a and 68b. The main pressure conduit 94 is connected to a priority valve 98 which, in turn, is connected to another main pressure conduit 100 supplied with fluid at main pressure through a branch 102 from conduit 24. As long as normal main pressure exists in conduit 100 and spool 68 is in the "off" position, priority valve 98 is open and fluid at main pressure flows through conduits 94 and 96. The accumulator conduit 96 is connected to a variable volume chamber 104 of an accumulator 106 formed integrally with the housing assembly 42. A piston 108 in the accumulator 106 is biased to a discharged position 108' by a spring assembly 110 and is stroked to a charged position against the springs, FIG. 2b, by fluid at main pressure. Accordingly, main pressure charges the accumulator when the spool 68 is in the "off" position.

With continued reference to FIGS. 2a and 2b, hydraulic fluid circulates from the torque converter 14 through a conduit 112 to a port 114 in the valve body 64 and then, with the spool 68 in the "off" position, between lands 68d and 68e to a cooler inlet port 116, a conduit 118, a cooler 120 and another conduit 122. The conduit 122 directs the fluid to a cooler exit port 124 in the valve body 64 and then, with the spool 68 in the "off" position, between lands 68c and 68d to a lube port 126 from which it is directed to the transmission lubricating circuit and back to the sump 20. Conversely, when the spool 68 is in the "on" position, FIG. 2a, port 114 is connected between lands 68c and 68d directly to lube port 126 so that fluid from the torque converter bypasses the cooler 120 and goes directly to the lubrication circuit.

A retarder return conduit 128 connects the closed chamber 60 outboard of impellers 44 with a port 130 in the valve body 64 while a retarder inlet conduit 132 connects a port 134 in the valve body 64 to the closed chamber 60 generally inboard of the friction discs 50 and 52. With the spool 68 in the "off" position, port 130 communicates below land 68e with a first regulating port 136 in the valve body 64 and therethrough to an exhaust 138 while inlet conduit 132 is fed with sufficient fluid through a bleed orifice 140 to lubricate the internal components of the retarder brake. In the "on" position of the spool 68, port 130 is connected between the lands 68d and 68e to cooler inlet port 116 and port 134 is connected between the lands 68b and 68c to cooler exit port 124 so that during hydrodynamic braking hydraulic fluid is continually pumped through the cooler 120.

The structural portions of control system 38 thus far described correspond generally to similar counterparts in the control systems for the retarder brakes described in the aforementioned U.S. Pat. Nos. 4,235,320 and 4,324,320 to Polak et al and Spurlin et al, respectively. Departing from these systems, control system 38 according to this invention includes a friction brake regulator valve 142 which, as described hereinafter, regulates fluid at a first supply or friction brake apply pressure according to a schedule represented by a curve 144 in FIG. 3 and a hydrodynamic brake charging pressure regulator valve 146 which, as described hereinafter, regulates a second supply or charging pressure according to a schedule represented by a curve 148 in FIG. 3. Describing first the friction brake regulator valve 142, the latter includes a stepped bore 150 in a valve body 152. The stepped bore 150 includes a large diameter portion a, an intermediate diameter portion b and a small diameter portion c closed at one end by the valve body 152. A valve spool 154 having three equal diameter lands a, b and c is slidably disposed in bore portion 150c. Land 154c cooperates with the closed end of the bore in defining a regulating chamber 156 communicating with the relief between lands 154b and 154c through an internal passage 158. Land 154c regulates main pressure in conduit 100 down to friction brake apply pressure at a port 160 in the valve body 152. The friction brake apply pressure is directed by a conduit 162 from the regulator valve 142 to a second regulating port 164 in the main valve body 64.

With continued reference to FIG. 2a, the spool 154 has a cylindrical extension 166 projecting into bore portion 150b and an integral annular flange 168 adjacent land 154a. A spring 170 is disposed around extension 166 and seats at one end against flange 168 and at the other end against a trimmer plug 172 slidably disposed in bore portion 150a. The trimmer plug 172 has a pilot 174 for centering spring 170 and is slidable in bore portion 150a between an extended position, shown in FIG. 2a, abutting a shoulder of the valve body 152 defining the innermost end of bore portion 150a and a retracted position, not shown, abutting a cover 176 closing the open end of stepped bore 150. A spring 178 is disposed around the spring 170 and seats at one end against a shoulder of valve body 152 defining the innermost end of bore portion 150b and at the other end against the trimmer plug 172, the spring 178 thereby biasing the trimmer plug toward the retracted position. Bore portion 150b communicates with an exhaust 180 through a port 182 in the valve body 152.

Describing now the charging valve 146, the latter has a valve body 184 including a stepped bore 186 having a large diameter portion a, an intermediate diameter portion b, and a small diameter portion c. A valve spool 188 has a pair of equal diameter lands a and b slidably disposed in bore portion 186a, a smaller diameter land c slidably disposed in intermediate bore portion 186b, and a still smaller diameter pilot d extending into small diameter portion 186c. A cap 190 is disposed on the valve body 184 and closes the open end of stepped bore 186, the cap cooperating with land 188a in defining a regulating chamber 192 communicating with the relief between lands 188a and 188b through an internal passage 194. Lands 188a and 188b cooperate with a pair of ports 196 and 198, respectively, to regulate charging pressure in the relief between lands 188a and 188b by alternately opening the relief to an exhaust 200 or to the pressure within a conduit 202 between the port 196 and a port 204 in the valve body 152 of friction brake regulator 142. The annulus between the bore portion 186c and pilot 188d defines a chamber 210 in which is disposed a spring 212 seating at one end against the valve body 184 and at the other end against the land 188c. The spring biases the spool 188 in a pressure increasing direction wherein land 188b closes exhaust port 198 and land 188a exposes port 196. Governor pressure in conduit 30 proportional to the speed of output shaft 32 is directed through an orifice 214 and into chamber 210 at a port 216 in the valve body 184 which is always open. Accordingly, the pressure increasing bias on valve spool 188 regulates increasing charging pressure with increasing speed up to a maximum equal to whatever pressure exists in conduit 202.

With continued reference to FIG. 2a, the relief between lands 188a and 188b is connected to retarder inlet conduit 132 by a conduit 218 so that charging valve 146 is operative to control the hydrodynamic charging pressure in the closed chamber 60 in the housing 42. A branch 220 extends between conduit 218 and the chamber 74 below partial apply valve 70 and has an orifice 222 therein to restrict flow in the branch. A second conduit 224 extends from chamber 74 to a port 226 in valve body 152 which communicates with the relief between lands 154a and 154b so that a flow path is established from the chamber 74, through conduits 224 and 202, to the port 196 in the charging valve 146. Finally, a conduit 228 connects the relief between lands 188a and 188b to the bore portion 150a behind trimmer plug 172 so that charging pressure, proportional to the speed of output shaft 32, acts on the trimmer plug in opposition to springs 170 and 178.

A logical sequential description of the operation of retarder brake 36 and control system 38 commences with the vehicle in forward motion without retarder demand. As described, the spool 68 in main valve body 64 is in the "off" position so that the chamber 60 in the housing assembly 42 is exhausted, torque converter fluid circulates through the cooler 120 before entering the lubrication circuit, and accumulator 106 is fully charged by fluid at main pressure. In addition, land 68e opens first regulating port 136 to exhaust 138 so that annular chamber 56 exhausts through a conduit 230 while chamber 74 below the partial apply valve exhausts through passage 80 in the latter to exhaust 138. Governor pressure proportional to speed in chamber 210 cooperates with spring 212 to bias valve spool 188 in the charging valve 146 against cap 190 while conduits 228 and 218 and the bore portion 150a behind trimmer plug 172 exhaust through either branch 220 or the retarder inlet conduit 132. Finally, with the trimmer plug in the retracted position, the spring 170 has maximum extension and, therefore, exerts minimum force on the spool 154 so that land 154c regulates main pressure at port 160 down to a relatively low friction brake apply pressure on the order of 25 PSI in conduit 162 which is blocked by land 70a at second regulating port 164 because the partial apply valve is held up by spring 78.

Figure 3:
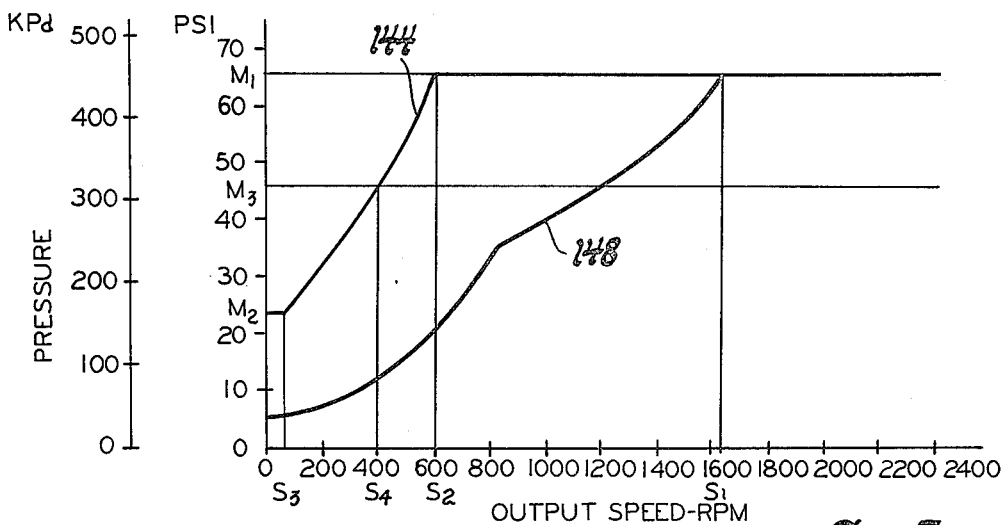
FIG. 3 shows pressure plotted against output speed for the retarder brake and control system according to this invention.

Description of the next logical step in the operational sequence requires, first, that two reference speeds of output shaft 32 be identified. Referring particularly to FIG. 3, a reference speed $S_1$, about 1600 RPM in one application, represents the boundary between an intermediate vehicle speed range and high vehicle speed range. A reference speed $S_2$, about 600 RPM in the same application, represents the boundary between the intermediate vehicle speed range and a low vehicle speed range. Assuming for description purposes that the vehicle is in forward motion in the high speed range and that the operator demands maximum retarder braking, pedal 92 is fully depressed so that maximum air pressure, exceeding about 85 PSI, is directed to chamber 84. Substantially instantly, valve spool 68 strokes to the "on" position and presses the partial apply valve 70 to a fully open position. As described, torque converter fluid passes directly to the transmission lubrication circuit and retarder inlet and return conduits 132 and 128, respectively, are connected to the cooler 120. At the same time, land 68a blocks main pressure conduit 94 while connecting accumulator conduit 96 to a branch 232 between lands 68a and 68b so that accumulator discharge flows through a check valve 234 in the branch 232 and then through conduit 230 to the annular chamber 56 thereby initiating instantaneous application of the friction brake so that the vehicle experiences some retarder braking very quickly. Since the annular chamber 56 behind piston 54 is normally maintained in a full, unpressurized condition because the conduit 230 is connected to the upper portion of the chamber and does not drain the chamber in the absence of retarder brake demand, only a small portion of the accumulator discharge is needed to effect initial application of the friction brake portion 58. The remainder of the accumulator discharge passes through orifice 236 and retarder inlet conduit 132 into closed chamber 60 to partially fill the chamber and initiate hydrodynamic braking.

At the very onset of retarder braking demand in the high speed range, governor pressure in chamber 210 holds spool 188 against cap 190 so that port 196 is exposed to the initial, relatively low pressure in the closed chamber 60 through conduit 218 and retarder inlet conduit 132. Further, since land 68e closes first regulating port 136 and land 70b opens second regulating port 164 when spool 68 strokes to the "on" position, the relief between lands 154b and 154c and regulating chamber 156 in the friction brake regulator valve 142 are exposed to the relatively low pressure between lands 188a and 188b through conduits 202, 224 and 162. Valve spool 154, therefore, shifts to the right to open port 160 so that fluid at main pressure begins flowing toward the relief between lands 188a and 188b to supplement accumulator discharge in filling closed chamber 60 through conduit 218 and retarder inlet conduit 132. However, because land 154a partially restricts port 204 when valve spool 154 is in the rightwardly shifted position, fluid flowing from conduit 224 to conduit 202 is regulated or throttled at port 204 to control the rate at which accumulator discharge is supplemented.

As accumulator discharge is supplemented at the controlled rate, the closed chamber 60 becomes completely filled and the pressure between lands 188a and 188b begins to increase as main pressure in conduit 100 attempts to force more fluid through conduits 162, 224 and 202. The pressure between lands 188a and 188b, the hydrodynamic retarder brake charging pressure, is communicated to closed chamber 60 through conduits 218 and 132 and is also directed against trimmer plug 172 through conduit 228 so that as the charging pressure increases the plug strokes from its retracted position to its extended position applying maximum compression to spring 170 to hold valve spool 154 in the rightwardly shifted position. With port 160 thus held open, the pressure in conduit 100 continues to urge fluid toward the closed chamber 60 through conduits 218, 202, 224 and 162 and increasing the charging pressure therein until the latter is regulated under either of two conditions.

The first condition referred to above assumes that vehicle speed has not been reduced below $S_1$ by the initial retarder friction braking and the increasing hydrodynamic braking so that governor pressure in chamber 210 continues to hold valve spool 188 against cup 190 and land 188a away from port 196. In this condition, charging pressure simultaneously increases between lands 188a and 188b, between lands 154b and 154c, and in regulating chamber 156 until a maximum pressure $M_1$, FIG. 3, is achieved which is sufficient to overcome spring 170. Valve spool 154 thereupon moves to the left completely opening port 204 and land 154c approaches port 160 and begins regulating friction brake apply pressure in conduit 162, and hence in conduits 224, 202, 218, and 132, at a maximum magnitude $M_1$, FIG. 3, proportional to the force of spring 170. Simultaneously, since annular chamber 56 is filled, the same maximum friction brake apply pressure $M_1$ is directed to the annular chamber through conduit 230.

The second condition referred to above assumes that initial retarder friction braking and increasing hydrodynamic braking slow the vehicle speed to $S_1$ or slightly below before $M_1$ is achieved between lands 188a and 188b. In this condition, the charging pressure between lands 188a and 188b and in regulating chamber 192 increases until governor pressure in chamber 210 and spring 212 are overcome whereupon land 188a at least partially closes port 196 to substantially restrict flow in conduit 202. While charging pressure is thus limited in proportion to speed by governor pressure, fluid backs up in conduits 202, 224 and 162 and the pressure therein and in regulating chamber 156 rapidly increases to $M_1$ whereat valve spool 154 moves back to the left as described with respect to the first condition.

Regardless of which condition exists, after the valve spool 154 has begun regulating at port 160, land 154a ceases to restrict flow at port 204 and, effectively, ceases to operate until the next succeeding occurrence of initial retarder braking demand. In addition, since charging pressure acts on piston 54 in opposition to friction brake apply pressure, the retarder friction braking experienced with initial retarder brake demand quickly disappears as charging pressure increases. In the first described condition, the ultimate charging pressure and friction brake apply pressure equalize so that piston 54 is disengaged from the friction disc by return spring 62 and retarder braking is completely hydrodynamic. During disengagement fluid escapes from annular chamber 56 through conduit 230 and branch 220. In the second described condition, the ultimate charging pressure is less than friction brake apply pressure so that a net friction brake apply pressure exists and retarder braking is a combination of hydrodynamic and friction braking.

Figure 4:
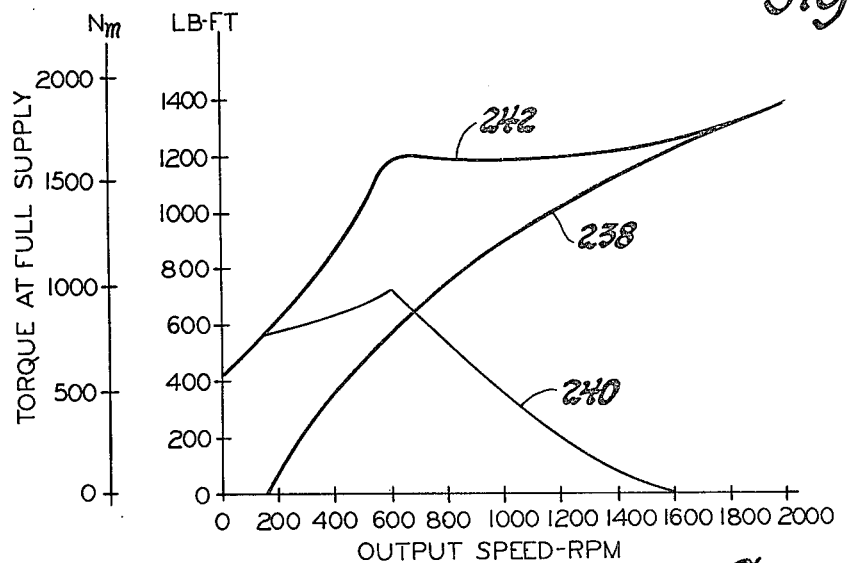
FIG. 4 shows torque plotted against output speed for the retarder brake and control system according to this invention.

Assuming, for purposes of description, a continuation of maximum retarder braking demand in the high vehicle speed range with only hydrodynamic braking occurring, the hydrodynamic brake portion 48 progressively retards the speed of the vehicle toward reference speed $S_1$. At $S_1$, governor pressure in conduit 30 and chamber 210 is insufficient to hold spool 188 against cap 190 in the charging valve so that lands 188a and 188b begin to regulate charging pressure generally in proportion to decreasing speed along curve 148, FIG. 3. The friction brake apply pressure, however, remains at maximum magnitude $M_1$, because the trimmer plug 172 is still held in the extended position by charging pressure as long as vehicle speed is in the intermediate range and output shaft speed exceeds reference speed $S_2$. In the intermediate speed range, then, two characteristics predominate. First, charging pressure decreases in accordance with curve 148, FIG. 3, generally in proportion to speed while staying sufficiently high to hold trimmer plug in the extended position so that hydrodynamic torque decreases along a curve 238, FIG. 4. Second, since friction brake apply pressure remains at magnitude $M_1$, net effective friction brake apply pressure develops across piston 54 causing a progressively increasing application of retarder friction brake portion 58. As best seen in FIG. 3, the difference between charging pressure and friction brake apply pressure increases as speed decreases toward $S_2$ so that the maximum net effective friction brake apply pressure occurs at reference speed $S_2$. As best seen in FIG. 4, friction brake torque increases along a curve 240 from $S_1$ to $S_2$ while total retarder brake torque, the sum of hydrodynamic and friction torques represented by a curve 242 in FIG. 4, remains essentially constant at all vehicle speeds above $S_2$.

Figure 5:
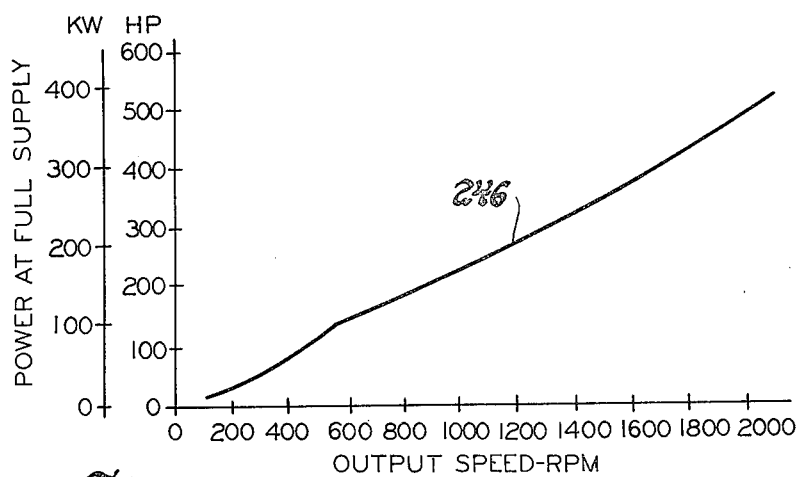
FIG. 5 shows power plotted against output speed for the retarder brake and control system according to this invention.

At reference speed $S_2$, and still at maximum retarder brake demand, the charging pressure, which remains generally proportional to speed, decreases to a magnitude insufficient to hold the trimmer plug in the extended position. Thus, as vehicle speed continues to decrease into the low speed range, the springs 170 and 178 stroke the trimmer plug 172 toward the retracted position causing a progressive lengthening of spring 170 and consequent decrease along the curve 144, FIG. 3, of friction brake apply pressure regulated by land 154c at port 160. By appropriate selection of springs 170 and 178 and by appropriately dimensioning the area of trimmer plug 172, the slope of curve 144 to the left of $S_2$ can be made steeper than the general slope of curve 148 representing the decrease of charging pressure. Therefore, as vehicle speed decreases below $S_2$ the difference between friction brake apply pressure and charging pressure, the net effective friction brake apply pressure, decreases. When trimmer plug 172 reaches the retracted position corresponding to a very low vehicle speed $S_3$, FIG. 3, land 154c commences regulation of friction brake apply pressure at a constant low value $M_2$, about 25 PSI in FIG. 3, while charging pressure proportional to speed continues down to an even lower magnitude near zero. As depicted by curve 242 in FIG. 4, the total retarder brake torque decreases below $S_2$, to about 30% of its maximum value near zero vehicle speed. Finally, as seen in FIG. 5, the total horsepower absorbed by the retarder brake 36 is represented by a curve 246 and exhibits a generally straight line proportional relationship to speed. The curve 246 is useful in that the horsepower absorption required to maintain a given vehicle at a given speed on a given grade can be plotted and, if it falls below curve 246, then the retarder brake has sufficient capacity to effect the required speed control.

To this point in the description, constant maximum retarder brake demand has been assumed. At retarder brake demand less than maximum, pedal 92 actuates regulator 90 to regulate air pressure in chamber 84 at magnitudes generally in a range between 15 PSI and 85 PSI. Pressures of this magnitude stroke the spool 68 to the "on" position and effect engagement between the lower end of the spool and the partial apply valve 70 but are insufficient to hold the spool down far enough against the full range of friction brake apply pressures acting on land 68e to prevent regulation by the partial apply valve 70 and land 68e. If, for example, the vehicle is in forward motion in the high speed range and the pedal is depressed an amount corresponding to 50% of maximum retarder braking, the initial application of the friction brake portion as described hereinbefore occurs first. Likewise, closed chamber 60 within the retarder brake fills with fluid and charging pressure increases and begins stroking the trimmer plug to the extended position causing the friction brake apply pressure to increase toward $M_1$. Friction brake apply pressure, however, acts on land 68e in opposition to the air pressure in chamber 84 and increases until it overcomes the air pressure and lifts land 68e above first regulating port 136 whereupon spool 68 and partial apply valve 70 cooperate to regulate friction brake apply pressure at an intermediate magnitude, $M_3$ in FIG. 3, proportional to retarder brake demand but less than the friction brake apply pressure $M_1$ otherwise scheduled by curve 144 for speeds above $S_1$. Further, since the vehicle is in the high speed range, the charging pressure is also limited to $M_3$ because governor pressure biases spool 188 against cap 190 in the charging valve to directly apply friction brake apply pressure to the chamber 60 through conduits 224, 202, 218 and 132. And again, $M_3$ is below the charging pressure $M_1$ otherwise scheduled by curve 148 for speeds above $S_1$. With friction brake apply pressure and charging pressure being equal, the net friction brake apply pressure is zero and retarder braking is completely hydrodynamic.

Assuming that partial retarder brake application reduces the speed of the vehicle, the partial apply valve 70 and spool 68 will continue regulating friction brake apply pressure and charging pressure at magnitude $M_3$ until speed decreases to the point where the horizontal line representing $M_3$, FIG. 3, intersects curve 148 whereupon charging valve 146 commences regulating charging pressure along curve 148 below $M_3$ while friction brake apply pressure remains at $M_3$. Because the charging pressure scheduled by curve 148 is less than the charging pressure $M_3$ proportional to retarder brake demand, a net effective friction brake apply pressure develops across piston 54 and total retarder braking becomes a combination of hydrodynamic and friction braking. The friction braking component achieves a maximum magnitude at a vehicle speed $S_4$ corresponding to the intersection of the horizontal line representing $M_3$, FIG. 3, and the curve 144. At speeds below $S_4$ the friction brake apply pressure scheduled by curve 144 and regulated by land 154c at port 160 is less than $M_3$ proportional to retarder brake demand so that friction brake apply pressure decreases with speed along curve 144. It will, of course, be apparent than at speeds below $S_4$, the control system 38 functions exactly as described hereinbefore with respect to maximum retarder brake demand.

The embodiments of the invention in which an exclusive property or privilege is claimed are defined as follows:

1. In a control for an output shaft connected retarder assembly having a friction brake portion and a hydrodynamic brake portion wherein a net friction brake apply pressure is equal to the difference between a friction brake apply pressure and a hydrodynamic brake charging pressure, the combination comprising, a first valve means providing a first hydraulic pressure regulated according to a first schedule such that said first pressure has a constant maximum first magnitude at output shaft speeds above a first reference speed and a plurality of first intermediate magnitudes generally proportional to speed at output shaft speeds below said first reference speed, a second valve means providing a second hydraulic pressure regulated according to a second schedule such that said second pressure has a constant maximum second magnitude equal to said maximum first magnitude at output shaft speeds above a second reference speed exceeding said first reference speed and a plurality of second intermediate magnitudes generally proportional to speed at output shaft speeds below said second reference speed, each of said intermediate second magnitudes being less than the corresponding one of said maximum first magnitude and said intermediate first magnitude so that the difference between said first and said second pressure magnitudes increases as output shaft speed decreases from said second reference speed to said first reference speed, and means directing said first pressure to said friction brake portion thereby to establish said friction brake apply pressure therein and directing said second pressure to said hydrodynamic brake portion thereby to establish said hydrodynamic charging pressure therein.

2. In a control for an output shaft connected retarder assembly having a friction brake portion and a hydrodynamic brake portion wherein a net friction brake apply pressure is the difference between a friction brake apply pressure and a hydrodynamic brake charging pressure, the combination comprising, a first valve means providing a first hydraulic pressure regulated according to a first schedule such that said first pressure has a constant maximum first magnitude at output shaft speeds above a first reference speed and a plurality of first intermediate magnitudes generally proportional to speed at output shaft speeds below said first reference speed, a second valve means providing a second hydraulic pressure regulated according to a second schedule such that said second pressure has a constant second maximum magnitude equal to said first maximum magnitude at output shaft speeds above a second reference speed exceeding said first reference speed and a plurality of second intermediate magnitudes below corresponding ones of said first intermediate magnitudes and generally proportional to speed at output shaft speeds below said second reference speed, means directing said first pressure to said friction brake portion thereby to establish said friction brake apply pressure therein and directing said second pressure to said hydrodynamic brake portion thereby to establish said hydrodynamic charging pressure therein, and a third valve means connected to each of said first and said second valve means and operative at any output shaft speed to limit said first pressure to the lesser of said magnitude according to said first schedule and a magnitude proportional to an externally applied retarder demand signal and to limit said second pressure to the lesser of said magnitude according to said second schedule and said magnitude proportional to said externally applied retarder demand signal.

3. The combination recited in claim 1 wherein the difference between said second intermediate magnitude according to said second schedule and said first intermediate magnitude according to said first schedule decreases in proportion to speed as output shaft speed decreases below said first reference speed.

4. In a control for an output shaft connected retarder assembly having a friction brake portion and a hydrodynamic brake portion wherein a net friction brake apply pressure is the difference between a friction brake apply pressure and a hydrodynamic retarder charging pressure, the combination comprising, a first valve means having a regulating element supplied with high pressure fluid for regulation down to a first supply pressure and biased in a pressure increasing direction by a spring disposed between said valve element and a trimmer movable between an extended position wherein said spring exerts a maximum force on said valve element corresponding to a maximum first supply pressure and a retracted position wherein said spring exerts a minimum force on said valve element corresponding to a minimum first supply pressure, means operative to locate said trimmer in said retracted position at output shaft speeds below a first reference speed and in said extended position at output shaft speeds above a second reference speed exceeding said first reference speed and to stroke said trimmer between said extended and said retracted positions in proportion to speed at output shaft speeds between said first and said second reference speeds so that said first valve provides said first supply pressure according to a first schedule such that said first supply pressure has a constant minimum magnitude at output shaft speeds below said first reference speed and a constant maximum magnitude at output shaft speeds above said second reference speed and a plurality of intermediate magnitudes generally proportional to speed at output shaft speeds between said first and said second reference speeds, a second valve means providing a second supply pressure regulated according to a second schedule such that said second supply pressure has a constant maximum magnitude equal to said first supply pressure maximum magnitude at output speeds above a third reference speed exceeding said second reference speed and generally proportional to speed at output shaft speeds below said third reference speed, said second supply pressure being less than said first supply pressure at all output shaft speeds below said third reference speed and the difference between said first supply pressure and said second supply pressure increasing as output shaft speed decreases from said third reference speed to said second reference speed and then decreasing as output shaft speed decreases from said second reference speed to said first reference speed, and means directing said first supply pressure to said friction brake portion thereby to establish said friction brake apply pressure therein and directing said second supply pressure to said hydrodynamic brake portion thereby to establish said hydrodynamic charging pressure therein.

5. The combination recited in claim 4 further including a third valve means connected to each of said first and said second valve means operative to limit said first supply pressure to the lesser of said magnitude according to said first schedule and a magnitude proportional to an externally applied retarder demand signal and to limit said second supply pressure to the lesser of said magnitude according to said second schedule and said magnitude proportional to said externally applied retarder demand signal.

* * * * *